United States Patent [19]

Sutherland

[11] 4,348,758
[45] Sep. 7, 1982

[54] DIGITAL DEBOUNCING AND STORAGE APPARATUS FOR USE IN A TELEPHONE SWITCHING SYSTEM

[75] Inventor: Joseph E. Sutherland, Raleigh, N.C.
[73] Assignee: International Standard Electric Corporation, New York, N.Y.
[21] Appl. No.: 156,298
[22] Filed: Jun. 4, 1980
[51] Int. Cl.³ .............................................. H04J 3/12
[52] U.S. Cl. .................................. 370/110.2; 370/105
[58] Field of Search ........................................ 370/110

[56] References Cited

U.S. PATENT DOCUMENTS 3,851,110 11/1974 Kelly et al. ...................... 179/18 EB
4,133,980 1/1979 Moed .................................... 370/110

Primary Examiner—Thomas W. Brown
Attorney, Agent, or Firm—John T. O'Halloran

[57] ABSTRACT

A digital debouncing and storage apparatus operates on the receiving end of a digital carrier span line used in a telephony system to couple a multiplex signal to a receiving site to be used by the switching network control. Incoming signaling bits of the multiplex signal are stored in a random access memory at a particular storage location reserved for each channel contained in a group. There is also stored at the location previous timing information concerning each sampling bit. The circuit operates to time any change in the value of a status bit to insure that it lasts long enough to indicate a valid change of state. An up/down counter serves to time each status bit during predetermined signaling frames based on a count inserted into the counter indicative of the timing information as stored in memory. Thus each channel associated with the multiplex signal has stored in memory a unique status bit as well as timing information pertinent to that bit. The circuit operates over a predetermined number of frames whereby if the status of the bit has changed between one binary value to another, the circuit will recognize such a change only after a given number of signaling frames have elapsed. In this manner, contact bounce or channel interference which may effect the signaling bit is eliminated from interferring with system operation.

7 Claims, 4 Drawing Figures

DIGITAL DEBOUNCING AND STORAGE APPARATUS FOR USE IN A TELEPHONE SWITCHING SYSTEM

BACKGROUND OF THE INVENTION

This invention relates to digital circuitry which discriminates against contact bounce emanating from a subscriber terminal in a digital telephone switching system and more particularly to apparatus for providing debouncing for a plurality of multiplex subscriber line circuits.

The telephone switching system is a prime example of a communications system which requires the reliable transmission of data between subscribers and which further provides the control of switching paths between various terminals. The telephone switching network, as indicated, is a means by which a communication channel capable of carrying information between any two subscribers is established and maintained. As is well known, such systems consist of many intricate details which are combined into an overall system capable of operating according to relatively broad principles. It is the nature of a switching system to resolve many problems which arise from the use of a telephone instrument by a subscriber, as well as problems associated with the use of electromechanical and other devices.

A basic requirement of any communications system, including a telephone switching system, is the reliable transmission of status information in order to properly control connections between subscriber lines and so on. In other words, a receiver in such a system must know the exact nature of the transmitter before the system can properly interpret and use the data being received. For example, in a telephone switching system when a user desires to make a call, he lifts his handset associated with the telephone instrument off hook. This off hook status informs the system that a service request is desired and a subscriber desires to make a call and subsequently be connected to a particular called party.

Thus, the on/off hook condition of a subscriber is a status condition which operates to inform the switching network that a service request is desired. Accordingly, other examples of status signaling in a telephone switching network include dial pulsing and ringing, as these conditions inform the switchboard that a line is either being used or a connection to a line is to be made and hence, the switching system must recognize the status of each line according to such condtions and keep the line in a busy state until it again becomes available.

In regard to status signaling, there are two major problems usually encountered in providing and establishing reliable status communication. A first problem is associated with the telephone subset and relates to the on/off hook condition. Most telephone subsets employ an electromechanical switch or device which is typically associated with switch bounce or contact bounce. In an all relay switching system, contact bounce can be discriminated against or even ignored as when a subscriber goes off hook, a central office battery causes a current to flow through the subset and the flow of such a current will activate an electromechanical relay or other device indicating that the subscriber has gone off hook. However, the modern switching systems employ high speed digital techniques and based on digital circuitry and high speed operation, switch bounce from electromechanical transducers create transient states which appear as improper data or in general, serve to confuse the high speed digital receiving systems incorporated in the digital switching network.

Apart from the switch bounce problem, a communication line which carries digital data may be interrupted, broken or otherwise interfered with, which conditions can also lead to false signaling and hence, provide the digital receiver with false data before the alarm circuitry associated with the system can implement appropriate preventive measures.

In any event, a widely used system for digital switching networks is referred to as a time division multiplex system (TDM). In such systems, each subscriber in a group can convey and receive digital data in a time slot or channel associated with the subscriber. TDM systems are well known in the telephone switching art and reference is made to a text entitled "Transmission Systems for Communications" by the Bell Telephone Laboratories, Third Edition (1964).

In prior art digital time division multiplex systems, contact bounce or switch bounce is discriminated against by the use of a low pass filter or some other debouncer circuitry. Essentially, a suitable circuit configuration consists of an R-C low pass filter for each line circuit, which filter is coupled between the electromechanical state detector and the multiplexer in the transmitter. Essentially, the prior art is replete with various schemes for discriminating against contact bounce and such techniques have been widely employed and utilized in the past. However, the prior art techniques require a separate debouncing circuit or a separate filter for each input channel and hence, for each subscriber line. As one can ascertain, while the solution appears to be relatively simple, the cost of implementing the same can be extremely expensive when considering a large multichannel system.

In regard to the problem of data interruption as affecting the communications line, prior art systems employed a network of shift registers at the receiving terminals, which registers operate to hold the signaling information or the status information for a predetermined period, which period is long enough to allow the system line failure detectors to determine a false signaling mode and attempt to compensate for the failure before false data is released from the receiver to the local terminal associated with the switching network.

It is an object of the present invention to provide a digital debouncing and storage circuit, which is incorporated at a receiving location in a TDM switching system and which circuit automatically provides a proper signal delay, while discriminating against switch or contact bounce for each of a group of subscribers associated with a sampling multiplexer.

The apparatus to be described essentially combines three basic functions in a single circuit configuration which enables a significant reduction in cost, parts count and space requirements, while providing and assuring reliable signaling data transfer for the network control associated with the switching system.

It is a further object of the present invention to provide a method for extracting signal status information from a multiplex signal, where the signal status information is undesirably effected by switch and contact bounce.

BRIEF DESCRIPTION OF THE PREFERRED EMBODIMENT

A digital debouncing and storage apparatus is employed for recovering status signaling information from A signaling and B signaling frames in a multiplex signal used in telephony. The A bits are transmitted during A signaling frames, while the B bits are transmitted during B signaling frames. Each status bit appears as the least significant bit in each 8 bit channel word during the signaling frames. In the multiplex signal transmitted there are 24 channels per frame with the 6, 18, 30---6X frames being A bit frames and with the 12, 24, 36---6Y being B bit frames.

During the A signaling frame each A bit for each channel is stored in a separate memory location together with timing information related to that A bit. During a B signaling frame each B bit is stored in another separate memory location one for each channel together with timing information related to that B bit. A word address counter provides the binary addresses for each channel during an A frame and this address is changed by one bit to select the proper storage locations during a B frame.

An up-down counter is coupled to the memory and receives the stored timing information for each channel during the respective signaling frames. If the status bit as stored has not changed in binary value the counter is caused to count at an increased rate. If the value has changed from the preceding frame the counter at a slower rate. The up-down counter is caused to count in an up or down direction under control of the value of the present status bit as stored in a status bit latch. The status bit latch stores the present value of the status bit for each channel during each frame and during signaling frames this is the A or B bit. If the value of the status bit has exhibited a new value for a predetermined number of successive signaling frames, as determined by said counter reaching a predetermined limit, the new value of the status bit is stored in memory together with new timing information and the new value is employed as the value of the status bit until another change occurs.

DETAILED DESCRIPTION OF INVENTION

Figure 1:
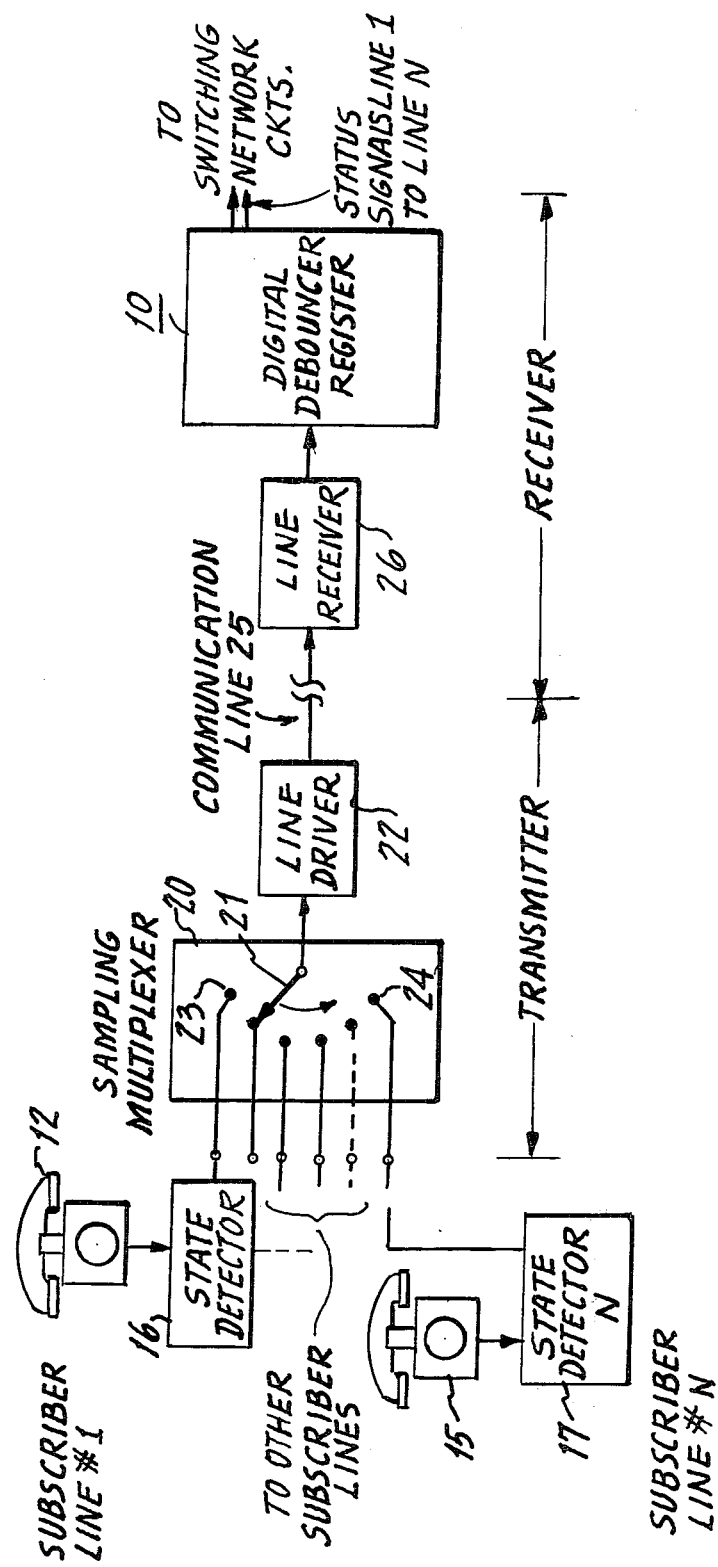
FIG. 1 is a simple block diagram useful in showing a multiplex telephone network incorporating apparatus according to this invention.

Referring to FIG. 1, there is shown a simple block diagram of a communications link employed in a TDM telephone switching network with the apparatus according to this invention referenced as numeral 10 and designated as a digital debouncer/register.

For purposes of simple explanation, a time division multiplex system, as those in the prior art, consists of a plurality of subscribers, each of which is associated with a telephone instrument as 12. The instrument 12 indicates a first subscriber in a group. A group of subscribers may consist of N subscribers and hence, N telephone subsets are employed with telephone subset 15 indicative of the Nth subscriber.

Each subset is associated with a state detector as 16 for subset 12, and 17 for subset 15. Essentially, the state detector is a circuit which interfaces with an electromechanical switch contained in the subsets 12 and 15 and capable of closing when the receiver associated with the subset is placed in the off hook condition.

As indicated, the electromechanical switch may be associated with contact bounce as well as the state detector 16. For example, the state detector 16 may be a relay or other device which accurately follows any contact bounce associated with the electromechanical switch in the subset or may, in fact, provide additional contact bounce or switch bounce based on its own operation.

Each group of subscribers as 12 to 15 representing N subscribers is connected to an individual input of a sampling multiplexer circuit 20. The multiplexer circuit 20 is shown in a simple circuit schematic as comprising a rotatable switch arm 21 which makes contact between each terminal as 23 to 24 associated with the N subscribers. Sampling multiplexers as well as sampling techniques in a TDM system are extremely well known in the art and reference is made to the above noted text, Chapter 24 entitled "Introduction to Pulse Code Modulation".

As is known, a widely used system employed in a TDM switching network is referred to as a twenty-four channel PCM system. In such a system, twenty-four subscriber lines as 12 to 15 are multiplexed on a single serial data path, which essentially is the output of the sampling multiplexer 20. Each channel as one to twenty-four consists of an eight-bit word of voice data (PCM). Essentially, each of the twenty-four channels is associated with one subscriber as 12 to 15 and since each sample requires eight clock periods including signaling, and since twenty-four samples (one per channel) are transmitted each sampling interval, a total of one hundred ninety-two clock periods per sampling interval are required. An additional one hundred ninety-third clock period is added to permit synchronizing or framing the two ends of the system. Thus, the one hundred ninety-three clock periods comprise a framing period. Since there are eight thousand such frames per second, the repetition rate on the line is 1.544 million clock periods per second. Normally, the time assigned to one clock period is about 0.65 microseconds and the pulses typical of a fifty percent duty cycle are therefore approximately 0.325 microseconds wide.

The term PCM is broadly used in the telephone art. Techniques for performing multiplexing can involve amplitude, width or position modulation of the pulses and such schemes are widely known and utilized.

In any event, in a typical standard twenty-four channel system, during every sixth frame, the least significant bit of each eight bit word indicative of each channel represents signaling information rather than voice. In a widely employed scheme such as the DS-1 used by International Telephone and Telegraph Corporation, the Assignee herein, two signaling bits (A and B) for each of the twenty-four channels are carried by alternating the use of the signaling frames between two bits. For example, an A bit may be designated as an on/off hook bit, or essentially, is a busy indicator for a particular subscriber as 12 to 15. Hence, during the sixth frame, the A bit, which is the least significant bit in the eight-bit word, represents the busy status of each of the twenty-four subscribers associated with the group. During the next signaling frame, which is the twelfth frame, the same least significant bit represents the B bit, which for example, may be a test bit. During the next signaling frame which would be the eighteenth frame, the least significant bit again represents the A bit and during the next signaling frame which would be the twenty-fourth frame, the least significant bit would again represent the B bit.

With the above description in mind, the output of the multiplexer 20 is the twenty-four channel DS-1 signal, from which frame, word and clock synchronization can be recovered. The serial signal is typically coupled to a line driver circuit 22 which serves to amplify the signal and provide an impedance match to a communication line 25. The line 25 or link is referred to as a span line and may, for example, be a coaxial cable, a fiber optic link or any typical communications link capable of carrying the multiplex data signal.

The span line is coupled at the receiving end to a line receiver 26 which again is an amplifier circuit capable of amplifying the signal to a desired level based upon the anticipated attenuation afforded by the span line 25. The output from the line receiver 26 is coupled to the digital debouncer/register 10. The debouncer/register, as will be explained in detail, receives the incoming signal emanating from the line receiver 26 and processes the signaling bits associated with the signaling frames to place these bits in a random access memory (RAM), which memory also stores, as will be explained, information about the history of each signaling bit associated with each channel.

The apparatus 10 also accomplishes the debouncing function by operating to time any change in the binary value of any signaling bit in any channel to assure that the bit change lasts long enough to indicate a valid and proper change of state.

Essentially, as will be explained, a timing count for each bit is stored in the memory with the actual value of the bit so that bits from different channels are completely independent. As can be seen from FIG. 1, the single digital debouncer/register 10 is located at the receiving end of the digital multiplex signaling path.

As will become more apparent, due to the nature of the particular signaling scheme which employs the two signaling bits A and B, forty-eight four bit words of memory are required to store the value of an A and B bit for each of the twenty-four channels, which requires one memory bit, while the other three memory bits store time delay information for each signaling bit and for each channel.

In summation, each of the twenty-four channels may have a binary value A bit and another binary value B bit both depending on the status of the associated line. Thus, the system accomodates two times twenty-four or forty-eight bits to maintain the status of 24 lines. Each bit is further associated with time delay information, which in this particular example, consists of three bits.

Referring to FIG. 2, there is shown a series of waveforms in order to depict the twenty-four channel DS-1 signal.

Figure 2A:
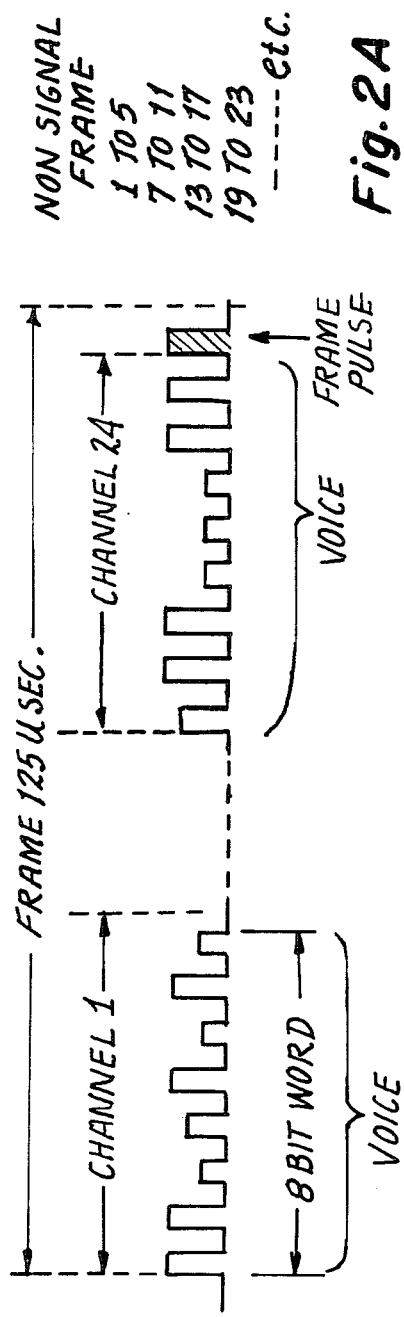
FIGS. 2A and 2B are a series of timing diagrams useful in explaining the nature of a multiplex signal.

FIG. 2A shows a typical information frame, which frame contains twenty-four eight-bit voice words and is terminated by a frame bit, as above explained. The frame is one hundred twenty-five microseconds in duration. As indicated, the voice frames are transmitted sequentially as frames 1 to 5, 7 to 11, 13 to 17, 19 to 23 and so on.

Figure 2B:
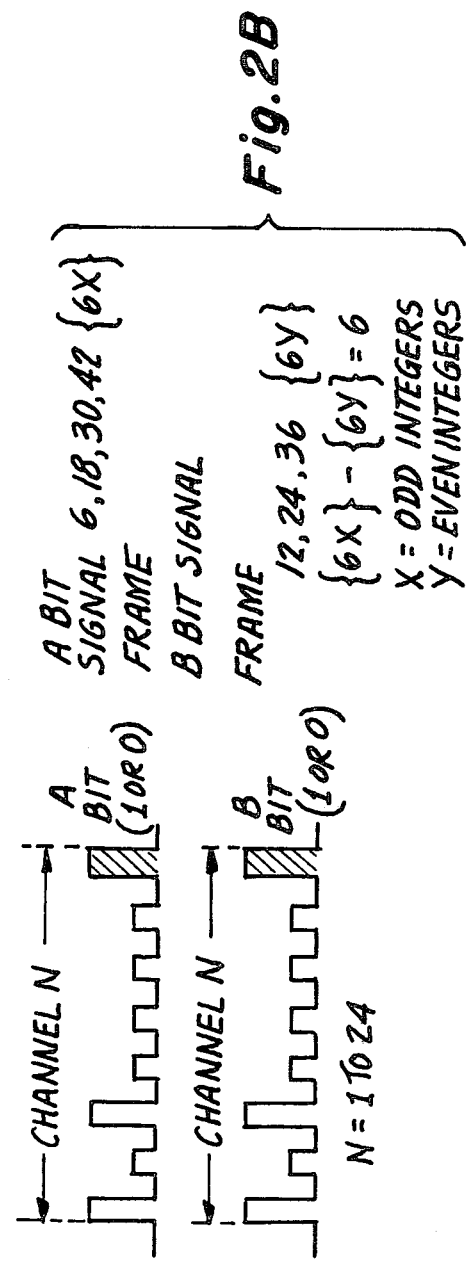

FIG. 2B shows a typical eight-bit voice channel during the signaling frame indicative of the A bit. As described above, each channel as channels one to twenty-four, during frames 6, 18, 30, 42 . . . 6X contains in the least significant bit, the A bit. On the other hand, each channel as shown again in FIG. 2B contains the B bit as the least significant bit in each word during frames 12, 24, 36 . . . 6Y. X and Y are odd and even integers.

As above indicated, the speech is in a digital format wherein the voice signal is coded according to a PCM code and assigned a weight value for each line and within each channel assigned to a line. As above indicated, each word therefore contains eight bits which are manifested by eight pulses or some other representation based on a sampling rate of eight thousand samples per second.

Figure 3:
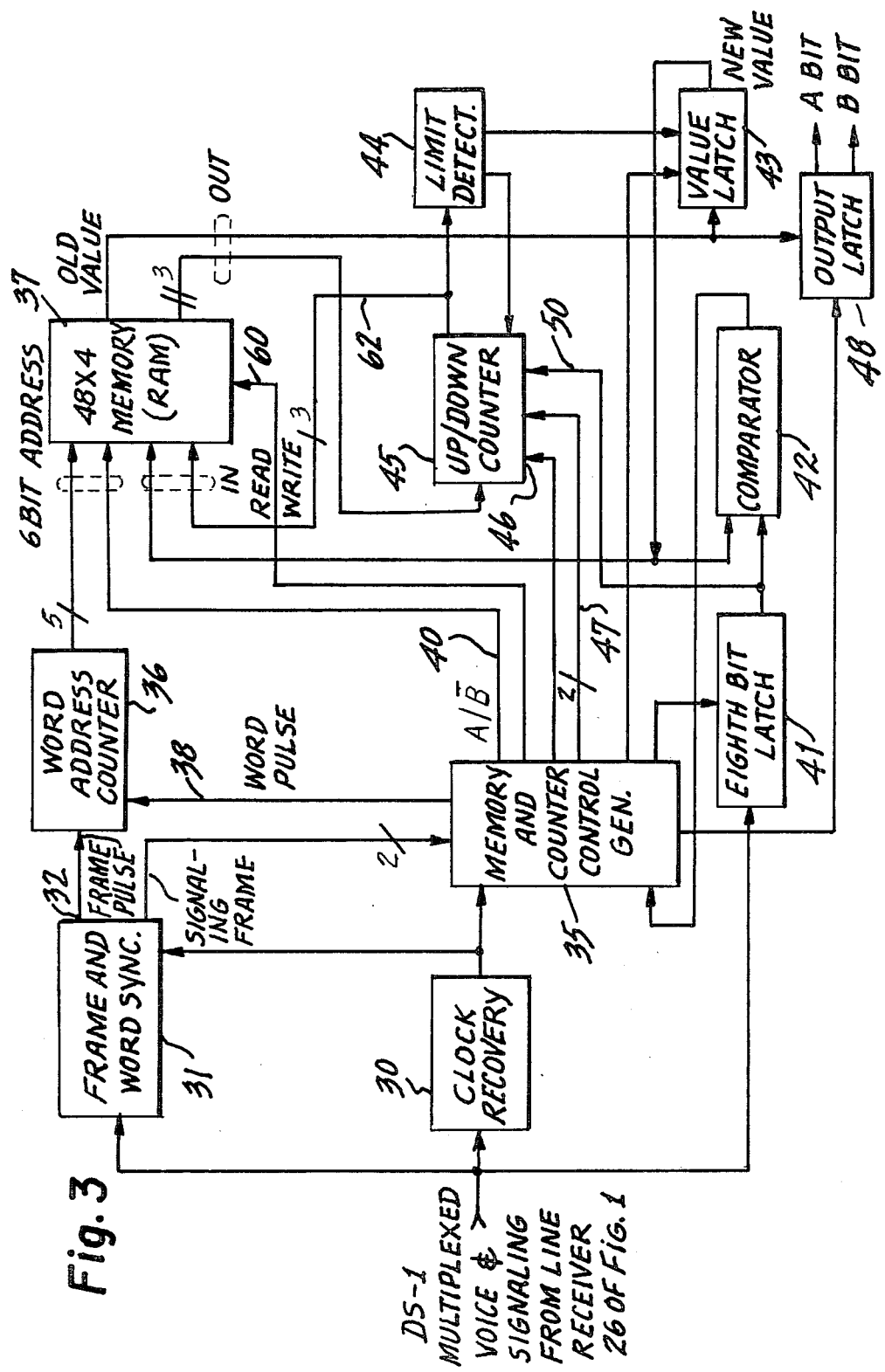
FIG. 3 is a detailed block diagram of a digital debouncing and storage apparatus according to this invention.

Referring to FIG. 3, there is shown a detailed schematic diagram of a digital debouncer/register as 10 of FIG. 1. The multiplex voice and signaling output from the line receiver, which essentially is a signal as above described in conjunction with FIG. 2, is applied to the input of a clock recovery circuit 30 and a frame and word sync circuit 31. The recovery of clock as implemented by circuit 30 is well known in the PCM art and many examples of suitable circuitry are available. Methods for extracting timing information from a multiplexed signal permit the regeneration of the clock signal at the receiving end.

There are literally many ways of accomplishing the results. Techniques for recovering the clock from a signal as shown in FIG. 2A are conventional and well known in the art. Essentially, the clock recovery circuit 30 operates on the multiplex signal to produce a series of pulses for each information bit, which therefore essentially corresponds to the clock signal used by the sampling multiplexer 20 to multiplex the various subscriber lines. If reference is made to the above noted text on pages 662 to 671, techniques for extracting the timing waveforms are shown and hence, recovery of the clock is accomplished by circuit 30 according to such techniques.

As depicted in FIG. 3, the multiplex signal and the recovered clock are applied to the frame and word sync generator. Essentially, the frame and word sync generator 31 operates to provide at its output, each frame pulse at terminal 32, as well as those pulses indicative of the signaling frames 6,12,18,24 . . . and so on at terminal 33. The frame and word sync circuit is also well known in the art and the above noted text also has complete circuit schematics and descriptions of techniques for recovering frame pulses from the multiplex signal and such techniques and circuitry as employed for module 31 are also well known in the art.

As a simple description, it is noted that each channel word contains eight bits. Hence, a counter which responds to the count of eight as gated with the clock pulses from module 30, will detect each channel and hence, each of the eight bit words. At the end of twenty-four counts or upon detection of one hundred ninety-two pulses, the next pulse or the one hundred ninety-third pulse is the frame pulse and this sequence continues throughout a data transmission. Thus, the frame and word sync detector 31 operates to respond to both frame pulses as well as providing word sync.

The technique of detecting signaling frames is also simple since the signaling frames are as above indicated. One merely, upon detection of frame pulses, provides a count and a track of each frame pulse and hence, decodes the 6th, 12th, 18th . . . and so on as signaling frames.

Also shown in FIG. 3 is a counter control generator 35. The counter control generator 35 receives an input from the clock recovery circuit 30 and inputs from the frame and word sync detector 33. The counter control generator is a plurality of counters and gates which operate, as will be explained, with the signaling frame pulse and the clock pulse to provide a plurality of control signals for synchronizing and assigning proper operation of the logic modules contained in the digital debounce/register.

Shown coupled to the frame pulse output 32 of module 31 is a word address counter 36. The word address counter 36 operates to provide twenty-four five-bit addresses used to access a random access memory 37 at its address input lines. The memory 37 is a forty-eight by four bit memory of the random access type capable of being read into or written out of. Such memories are well known in the art and many examples of suitable memories are available from many sources as conventional integrated circuits. Thus, the memory 37 has forty-eight storage locations, each of which is capable of being separately addressed by a six-bit address and each storage location is capable of storing four unique bits.

The word address counter is a binary counter which is set to zero upon receipt of each frame pulse. The counter receives a clock input from the counter control generator 35 via lead 38. This input is generated for each eight bit word in a frame and hence, for each of the twenty-four channels in a frame. The word address counter counts in a binary or other code from zero to twenty-three to thus access the memory at twenty-four unique positions during the A signaling frame and at twenty-four additional unique positions during the B signaling frames, as will be further explained.

In order to provide access to forty-eight storage locations to enable storage in the memory 37 of all A and B bits associated with each of the twenty-four channels, the counter control generator 35 provides an A/B̄ signal at output leads 40. In this manner, the counter control generator, based on receipt of the signaling frame signal from detector 31, provides one binary value during all A signaling frames and a second binary value during all B signaling frames. Hence, the address as generated by the word address counter 36 is modified by the bit generated on lead 40 and therefore the memory 37 is accessed at the forty-eight addresses indicative of A or B pulses. Accordingly, as one can see, the memory essentially can have the first twenty-four addresses reserved for the A bits associated with channels one through twenty-four and the next twenty-four addresses associated with the B bits of the same channels. The generation of these addresses, as explained above, is afforded by the operation of the word address counter 36 in conjunction with the counter control generator 40.

As also depicted in FIG. 3, there is shown a circuit 41 designated as the eighth bit latch. This circuit has a first input for receiving the multiplex signal and a second input from the counter control generator 35. The counter control generator 35 operates with a clock signal and the signaling frame input to develop a strobe pulse during the eighth bit or during the least significant bit in each eight-bit word. Hence, the strobe which is generated via generator 35 enables the eighth bit latch to store therein the A or the B bit as actually transmitted on the signal path. As will be immediately understood, the latch 41 comprises a triggerable bistable multivibrator, which multivibrator is enabled by the strobe pulse from the generator 35 and triggered according to the signaling bit emanating from the data line.

The output of the eighth bit latch 41 is coupled to the input of a comparator circuit 42 which, as will be explained, operates to compare the new value of a signaling bit with the present value.

The memory 37, as indicated, has forty-eight storage locations each capable of storing the bit value and a timing information signal associated with each signaling bit A or B for each of the twenty-four channels. An output from the memory designated as old value is the one bit output indicative of the last value of a signaling bit and this is stored or directed to an output latch 48 which is strobed or activated by a strobe signal generated by the counter control generator 35. The old value is also directed to a value latch 43 which also receives a strobe from the generator 35 and has another input taken from a limit detector circuit 44 which operates in conjunction with an up/down counter 45.

The up/down counter 45 is a conventional counting circuit which counts in an up direction upon enabling of an up count lead and in a down direction upon enabling of a down count lead. The up/down counter 45 counts in either direction in accordance with an input clock which is applied to terminal 46 and which is derived from the counter control generator 35. The up/down counter, as will be explained, receives the three bits of timing information, which bits are stored and updated in the memory 37 for each signal bit associated with each channel. The up/down counter receives an enable signal from the counter control generator 35 on two leads 47. The direction of the count is controlled by the binary value stored in the eighth bit latch circuit 41 via lead 50.

The up/down counter operates to be incremented or decremented depending on the value of the new signaling sample obtained from the communication line and held by the latch 41. If the counter reaches an upper or lower limit, as will be explained, the value latch 43 is set to one or zero via the limit detector 44. The limit detector 44 further prevents the up/down counter from resetting when it reaches an upper limit of all ones or a lower limit of all zeroes during a pattern signal bit, as will be explained.

The operation of the system depicted in FIG. 3 depends upon the limit set into the counter 45, which limit essentially determines both filtering and delay specifications. In regard to the above noted signal, the counter limit is set for an upper limit of 7 or binary 111 and hence, a three stage counter 45 is employed. Such counter configurations are well known in the art and an example of a suitable arrangement is the 74 LS 168 which is an up/down counter supplied by many integrated circuit manufacturers. The operation of the system is as follows.

Let us first assume that the first signaling frame, which is the sixth frame, is detected by the frame and word sync detector 31. During the signaling frame, the following operations occur: The memory 37 is cycled through twenty-four addresses indicative of the A bit for each channel. The counter control generator further can activate memory 37 via lead 60 to cause it to read or write in any storage location indicative of any channel. As above indicated, frames 6, 18 etc. are all indicative of A bits. The word address counter therefore addresses the memory for channel 1 indicative of the first word in the signaling frame. The least significant bit or the A bit of channel 1 is stored in the eighth bit latch 41. For the purposes of discussion the old value stored in memory location for channel 1 is assumed to be a zero and the timing count is assumed to be 111. Hence, the timing count of seven is loaded into counter 45. Let us further assume that the least significant bit associated with channel 1 is a binary zero and therefore, no change has occurred. The value stored in the eighth bit latch 41 is a binary zero and causes the up/down counter via lead 50 to count down. Since the old value is the same as the new value, the counter is caused to count down twice in this mode due to the clock input from the counter control generator 35. Hence, the up/down counter goes from 111 to 101. The new count of 101 is then transferred to the memory via lead 62, where it is stored in the memory location for channel 1 as the new count. The value of zero for the A bit of channel 1 is still retained in the memory as a zero. The output latch 48 thus indicates a zero for the A bit indicative of a zero A bit on channel 1.

Basically, the fact that the A bit for channel 1 remains a zero is typical of telephone switching operation as, for example, when a subscriber goes off hook or stays on the hook, he does so for a relatively long period compared to the sampling rate and the frame rate. Therefore, in this system, when there is no change in a bit, the counter 45 is rapidly caused to count down in the desired direction to thus quickly indicate that there has been no change in the status of the particular line. It can be thus seen that the up/down counter will reach its lower limit of all zeroes fairly rapidly and stay at all zeroes, if the subscriber has not changed his status. Since the limit detector 44 detects all zeroes, it will prevent the counter from undesirably going to all ones if the signaling bit has not changed. The value latch 43 will not change its state as the old value of a zero is inputted to the latch.

Now assume that the subscriber associated with channel 1 goes off hook and hence, the A bit goes from binary zero to binary one. The binary one is immediately stored in the eighth bit latch 41 during the appropriate signaling frame. As indicated, a binary one in latch 41 causes counter 45 to now count up from its all zero state. Hence, the counter now goes from count 000 to count 001. This is accomplished at a single rather than double clock rate since the old value is not the same as the new value. Essentially, the eighth bit latch 41 has stored therein a binary one, while the value latch 43 still has the old value of binary zero stored therein. The comparator now sees a difference in value which informs the clock control generator to gate the up/down counter at a clock rate of one instead of two, since the direction of count has changed. Thus, for the new A bit, the up/down counter goes from 000 to 001. If the A bit is a valid bit, and not due to a line disturbance and so on, it will remain and hence, during the next A bit signaling frame, the binary one will remain and the counter will again advance in the up direction by a count of one. Hence, after seven A bit signaling frames, the up/down counter will reach its upper limit of all ones, due to the fact that the A bit has not changed. This is immediately detected by the limit detector 44, which now activates the value latch 43 during the strobe from counter control 35. The value latch changes its value from zero to one, which new value is stored in the memory location associated with channel 1. The count of 111, which is the new count of the up/down counter, is also now stored in the same memory location. Thus after the seven frame signaling cycles, the circuit has made an accurate decision that the A bit is a valid one and its status is changed from the zero to the one. It can be seen that if the A bit changes again before the termination of seven signaling frames, that the value is not changed due to the fact that the counter 45 will be decremented back towards all zeros when a change occurs from zero to one and then back to zero.

The same exact procedure occurs for each of the twenty-four channels and hence, the value of the A bit is stored for each of the twenty-four channels based on the same decision making processes as above described. In an exactly similar manner, the value for each B bit is also stored in the memory by the same exact procedure used during B bit signaling frames for each channel.

In conjunction with the twenty-four channel multiplex signal as above described, it is now noted that since a new sample for each signaling bit is received every twelve frames, and one frame arrives every one hundred twenty-five microseconds, it takes 10.5 milliseconds ($7 \times 12 \times 125$ microseconds) to drive the counter 45 to its limit. Accordingly, the circuit delays A bit and B bit signals by 10.5 milliseconds and blocks pulses shorter than 10.5 milliseconds.

As can be simply seen, since the data into latch 41 is the actual line data, any bounce or change in the signaling bit will be discriminated against by the up/down counter being incremented or decremented according to the operating principles.

With the above noted structure in mind, it is immediately apparent that the circuit shown can be employed with any particular type of multiplex signal. For example, it is not necessary to transmit A and B bits as described and the same exact circuitry will work if only signaling bits are transmitted on any frame. For example, the same exact circuit would work if signaling information were contained in each eight bit sample on a word rate, as it will become immediately apparent that the counter control generator 35 could operate on a word basis, on any frame basis, or to capture any bits contained in the multiplex channel, which bits are indicative of signaling. Hence, while the above described discussion was directed towards the retrieval of one bit, more than one bit indicative of signaling on a frame or a word basis could be accommodated as well.

The concept and circuitry enables a substantial reduction in the cost and space requirements in telephone switching systems for providing demultiplexing, debouncing and delaying of signaling conditions.

By again referring to FIG. 3, one immediately notes that the word address counter 36 is operated and caused to cycle for a frame pulse, including those frame pulses which are not associated with signaling frames. Essentially, what occurs during a non-signaling frame is extremely important, as will now be explained. Operation during a non-signaling frame omits the memory storage step because no new sample is available from the communications line. However, during each frame, memory data is recalled based on the fact that the memory is addressed and hence, the old value as stored for each channel is always available at the output latch 48 as an A bit during the A bit scan and as a B bit during the B bit scan. In this manner, the switching network can interrogate the output latch 48 during any frame for each channel to determine the exact status of the A and B bits and hence, to enable the system to make connections or to otherwise perform operations on that line during any frame apart from a signaling frame. This aspect is extremely important and is automatically provided for by the above described operation. Hence, there is continuous availability of data at the output latch 48 between signaling frames.

It is thus understood that the above described technique can be applied to any time division multiplex communications system that handles multiple status signals which may undesirably suffer from switch contact bounce or from communications line interruption.

It is, of course, understood that the components and circuit structure described in FIG. 3 could be varied in regard to the number of bits, the response and delay times without departing from the organization of the structure and the basic principles embodied in this invention.

I claim:

1. A digital debouncing and storage apparatus for use in recovering status signaling information contained in a serially transmitted digital multiplex signal as transmitted in a telephone system with said signal having repetitive frames of information each frame consisting a group of channels, each channel having the same given number of bits, with certain first ones of said frames reserved for first status information with at least one A status bit in each channel of said first frames indicative of a first status condition of said associated channel and with second different ones of said frames reserved for second status information with at least one B status bit at the same location as said A bit in each channel of said second frames indicative of a second status condition of said associated channel, with both said status bits as generated by said telephone system capable of undesirably providing a false indication of the proper status of said channel due to contact bounce which may undesirably occur during the generation of said first and second status information comprising:

means responsive to said multiplex signal for generating a first signal indicative of each of said transmitted frames, a second signal indicative of only said first ones of said frames, a third signal indicative of only said second ones of said frames, a fourth signal indicative of each channel in each frame, and a fifth signal indicative of said location of said A or B bit in each of said channels, memory means having a plurality of addressable storge locations, with a first plurality of said storage locations each one associated with one channel in said group and capable of storing therein a given number of bits with at least one bit indicative of said A bit in said associated channel, and with a second plurality of said storage locations each one associated with one channel in said group and capable of storing therein said given number of bits with at least one bit indicative of said B bit, with said additional bits as stored in said first and second locations indicative of timing information associated with said respective status bit, a word address counter coupled to said memory means and said timing means and responsive to said fourth signal to provide a plurality of binary address codes for each channel in said group, and responsive to said second and third signals to modify said address codes by one bit to thereby provide first address codes to access said memory means at said first plurality of locations indicative of A status bits, and second address codes to access said memory means at said second plurality of locations indicative of B status bits, an up-down counter coupled to said memory means and having a first input adapted when activated to cause said counter to count-up from a stored count and a second input adapted when activated to cause said counter to count down from said stored count, said up-down counter adapted to sequentially store said timing information for each channel as stored in said memory for said A and B bits, a status bit latch responsive to said multiplex signal and said fifth signal for storing therein said respective present status bit for each channel during said first or second ones of said frames, logic means coupled to said first and second inputs of said up-down counter and responsive to said present status bit as stored in said status bit latch to cause said counter to count up from said stored count for a first binary value of said present status bit and to count down from said stored count for a second binary value of said status bit for each channel, control means coupled to said up-down counter and responsive to said count contained therein for said channel for causing said count indicative of new timing information to be stored in said memory means, and limit means coupled to said up-down counter and responsive to said count reaching a predetermined limit during successive first and second ones of said frames for changing the value of said status bit as stored in said memory upon detection of said predetermined limit.

2. The digital debouncing and storage apparatus according to claim 1 further including:

comparator means coupled to said status bit latch and said memory means for comparing said present status bit with said status bit as stored in said memory means for providing a control signal indicative of a change in said present status and means coupled to said up-down counter and responsive to said control signal to change the rate at which said up-down counter counts.

3. The digital debouncing and storage apparatus according to claim 1 wherein each group of channels consists of twenty-four channels, with each channel consisting of eight bits and with the least significant bit during frames 6, 18, 30 . . . 6X being said A bit, and with the least significant bit during frames 12, 24, 36 . . . 6Y being said B bit, where X and Y differ by six and equal six plus the last frame number during which said A or B bits were transmitted.

4. The digital debouncing and storage apparatus according to claim 3 wherein:

said multiplex signal has a frame rate of one hundred twenty-five microseconds.

5. The digital debouncing and storage apparatus according to claim 1 wherein said memory means is a random access memory (RAM) having 48 storage locations with said first plurality being 24 storage locations for storing therein said A bits and said additional timing bits associated with said A bits, and said second plurality being 24 storage locations for storing therein said B bits and said additional timing bits associated with said B bits.

6. The digital debouncing and storage apparatus according to claim 1 wherein said first binary value of said present status bit is a binary one, and said second binary value is a binary zero.

7. The digital debouncing and storage apparatus according to claim 1 further including:

output latching means coupled to said memory means to provide said status bit as stored for each channel during those frames not included in said certain first or second different ones.

* * * * *